(12) United States Patent
Nelson et al.

(10) Patent No.: US 7,297,263 B2
(45) Date of Patent: Nov. 20, 2007

(54) EFFICIENT WATER FILTERS

(75) Inventors: David Nelson, Oakland, CA (US);
Edward R. Rinker, Oakland, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 11/461,993

(22) Filed: Aug. 2, 2006

(65) Prior Publication Data
US 2006/0260997 A1  Nov. 23, 2006

Related U.S. Application Data

(63) Continuation-in-part of application No. 10/822,573, filed on Apr. 12, 2004, now abandoned.

(51) Int. Cl.
*B01D 39/16* (2006.01)
*C02F 1/28* (2006.01)

(52) U.S. Cl. .................. 210/282; 210/503; 210/504; 210/506; 210/510.1

(58) Field of Classification Search ............... 210/504, 210/282, 290, 496, 502.1, 503, 506, 510.1
See application file for complete search history.

(56) References Cited

U.S. PATENT DOCUMENTS

| | | | |
|---|---|---|---|
| 3,327,859 A | 6/1967 | Pall | 210/266 |
| 3,343,680 A * | 9/1967 | Rice et al. | 210/263 |
| 3,420,709 A | 1/1969 | Barrett et al. | 127/53 |
| 4,620,932 A | 11/1986 | Howery | 210/808 |
| 4,749,481 A | 6/1988 | Wheatley | 210/282 |
| 4,753,728 A | 6/1988 | VanderBilt et al. | 210/282 |
| 4,851,122 A | 7/1989 | Stanley | 210/501 |
| 4,859,386 A | 8/1989 | VanderBilt et al. | 264/113 |
| 4,969,996 A | 11/1990 | Hankammer | 210/282 |
| 4,980,073 A | 12/1990 | Woodruff | 210/767 |
| 5,017,318 A | 5/1991 | Vanderbilt et al. | 264/113 |

(Continued)

FOREIGN PATENT DOCUMENTS

JP        2001-58111        *  3/2001

OTHER PUBLICATIONS

U.S. Appl. No. 10/756,478, filed Jan. 2004, Taylor.

*Primary Examiner*—Thomas M. Lithgow
(74) *Attorney, Agent, or Firm*—Stacy Combs; Alok Goel

(57) ABSTRACT

Water treatment devices that include filtration media with specified grain size distributions are provided. In one arrangement, the device contains a volume of grains such that between about 1 and 15 vol % of the grains have a grain size in a range between a first grain size and a second grain size, a first portion of the grains have grain sizes smaller than the first grain size, and a second portion of the grains have grain sizes larger than the second grain size. The first grain size can be between about 50 and 100 μm and the second grain size can be between about 100 and 150 μm. In other arrangements, the first grain size can be between about 70 and 90 μm and the second grain size can be between about 100 and 130 μm. The difference between the first grain size and the second grain size can be at least 20 μm. In other arrangements, the difference between the first grain size and the second grain size can be at least 10 μm.

6 Claims, 5 Drawing Sheets

U.S. PATENT DOCUMENTS

| | | |
|---|---|---|
| 5,114,570 A | 5/1992 | Nelson et al. ................. 210/94 |
| 5,344,558 A | 9/1994 | Kool .......................... 210/117 |
| 5,679,248 A | 10/1997 | Blaney ....................... 210/315 |
| 5,922,803 A | 7/1999 | Koslow et al. ............. 524/496 |
| 5,976,362 A | 11/1999 | Wadsworth et al. .......... 210/87 |
| 5,997,829 A * | 12/1999 | Sekine et al. ............... 423/210 |
| 6,012,232 A | 1/2000 | Weyrauch ...................... 34/61 |
| 6,099,728 A | 8/2000 | Bairischer .................. 210/266 |
| 6,123,837 A | 9/2000 | Wadsworth et al. .......... 210/87 |
| 6,241,893 B1 | 6/2001 | Levy .......................... 210/660 |
| 6,290,848 B1 | 9/2001 | Tanner et al. ............... 210/266 |
| 6,368,504 B1 | 4/2002 | Kuennen et al. ............ 210/315 |
| 6,395,190 B1 | 5/2002 | Koslow et al. ............. 210/767 |
| 6,413,302 B1 | 7/2002 | Harrison et al. ................ 96/63 |
| 6,454,941 B1 | 9/2002 | Cutler et al. ................. 210/266 |
| 6,565,749 B1 | 5/2003 | Hou et al. ............. 210/500.38 |
| 7,160,453 B1 * | 1/2007 | Matsumura et al. ........ 210/315 |
| 2002/0062740 A1 | 5/2002 | Brukov et al. ................ 96/153 |
| 2002/0195407 A1 | 12/2002 | Levy .......................... 210/767 |
| 2003/0085169 A1 | 5/2003 | Reid .......................... 210/435 |
| 2003/0140785 A1 | 7/2003 | Koslow ........................ 95/90 |

* cited by examiner

EFFICIENT WATER FILTERS

This application is a continuation-in-part of and claims priority under 35 USC §120 to application Ser. No. 10/822,573, filed Apr. 12, 2004, now abandoned which is incorporated by reference herein."

BACKGROUND OF THE INVENTION

1. Field of the Invention

This invention relates generally to water filtration, and, more specifically, to small-sized water filters with high filtration performance.

2. Description of the Related Art

Unwanted and potentially harmful contamination in water, especially drinking water, is of concern to many people. This concern creates a desire for water treatment devices in the home and elsewhere. Many water treatment devices and methods have been developed to remove or neutralize particulate and chemical contaminants.

Major categories of consumer water filtration systems include plumbed-in or faucet-mount systems that rely on the pressure of the water supply to force untreated water through a water treatment device and non-plumbed, pour-though or batch systems that rely on gravity to move water from an upper influent water chamber, through a filtering means, to a lower effluent water chamber. In general, most pour-through systems use water filters made of loose filtration media, as the force of gravity is not usually enough to push water through more compacted media. On the other hand, most systems that are plumbed into a water line or mounted onto a faucet filter water through porous composite blocks made from filtration media and binders. Water is driven through the block by pressure in the water supply line. Water treatment systems that can use porous composite blocks include under-the-sink, faucet-mount, and refrigerator systems, among others.

One measure of the effectiveness of water treatment relates to adsorption of impurities from the water by the filtration media. One factor that influences the adsorption of impurities is the length of time the water is in contact with the filtration media. In general, the longer the contact time, the more impurities can be adsorbed from the water. On the other hand, even if slowing the flow rate of the water increases the contact time, it is undesirable, for example, for a normally robust faucet water stream to slow to a trickle in order to provide effective water treatment. Mitigating these competing concerns has resulted in large porous composite carbon blocks for faucet-mount water treatment systems. The water can move through the filter at an acceptable rate but has enough contact time with the treatment media because of the length of the path therethrough to provide effective impurity removal.

Whereas a typical faucet is slim and unobtrusive in design, a faucet-mount filtration system attached to a faucet outlet adds considerable bulk because of the size of the porous composite filter block. The large size limits use of these systems as it limits places where they can fit easily. Currently, typical porous composite carbon blocks for faucet-mount water treatment systems as manufactured by Brita® and by PUR® are between 120 and 130 $cm^3$ in size. If the porous composite carbon blocks could be made smaller and maintain or improve their performance, they would be less obtrusive and could be used in more places, such as inside a faucet or on smaller faucets or appliances where currently their bulk could cause an unacceptable mechanical strain. Smaller water filters made of loose filtration media could also be used in applications where filters of conventional size are too large, such as in portable drinking systems.

Accordingly, there is a need for water treatment devices that are small in size and can still meet acceptable standards for contaminant removal.

SUMMARY OF THE INVENTION

Water treatment devices that include filtration media with specified grain size distributions are provided. In one arrangement, the device contains a volume of grains such that between about 1 and 15 vol % of the grains have a grain size in a range between a first grain size and a second grain size, a first portion of the grains have grain sizes smaller than the first grain size, and a second portion of the grains have grain sizes larger than the second grain size.

The first grain size can be between about 50 and 100 μm and the second grain size can be between about 100 and 150 μm. In other arrangements, the first grain size can be between about 70 and 90 μm and the second grain size can be between about 100 and 130 μm. The difference between the first grain size and the second grain size can be at least 20 μm. In other arrangements, the difference between the first grain size and the second grain size can be at least 10 μm.

The first portion of the grains can make up between about 10 and 50 vol % of the media. In some arrangement, the first portion can be between about 35 and 50 vol %.

The second portion of the grains can make up between about 10 and 50 vol % to the media. In some arrangements, the second portion can be between about 35 and 50 vol %.

A system for treating water, which uses the water treatment devices is also provided.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1A:
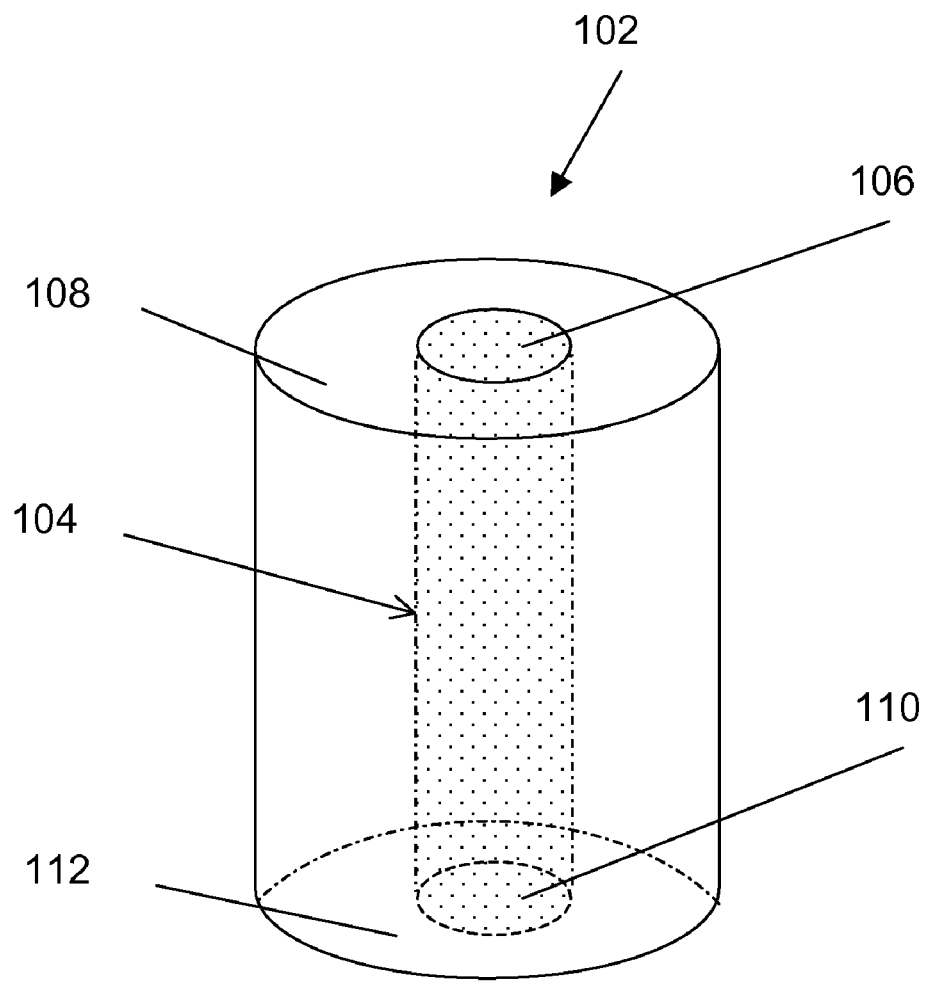
FIG. 1A is a perspective view of a cylindrical porous carbon block filter.

The preferred embodiments are illustrated in the context of water filters for domestic use. The skilled artisan will readily appreciate, however, that the materials and methods disclosed herein will have application in a number of other contexts where water treatment is desirable, particularly where size is important.

These and other objects and advantages of the present invention will become more fully apparent from the following description taken in conjunction with the accompanying drawings.

Water treatments systems include pour-through pitchers and carafes, in-line systems, under-the-sink systems, faucet-mount systems that attach to conventional sink faucets, counter top water dispensers, water dispensers suitable for use in refrigerators, water coolers with and without heating modules, portable filtered drinking devices such as water bottles, and various beverage making apparatus. Typically water treatment systems include a housing that has an inlet for source water to enter the system and an outlet for treated water to leave the system. The source water enters the inlet and flows into a filter device that contains filtration media. There are multiple fluid path within the filtration medium, along which the source water can flow, thus becoming treated water. The treated water can leave the system through the outlet.

The filtration media can contain carbonaceous media, such as activated carbon. There can be other components in the filtration media, such as carbonized synthetic materials, hydrophobic polymeric adsorbents, activated alumina, activated bauxite, fuller's earth, diatomaceous earth, silica gel, calcium sulfate, zeolite particles, inert particles, sand, surface charge-modified particles, metal oxides, metal hydroxides, or combinations thereof. All these media can be referred to as "active" media because they all interact with water to remove impurities therefrom.

For the purposes of this disclosure, the term "loose media filter" refers to a filtration device in which the active filtration media is not specifically bound together through use of a binding agent. Loose media filters contain granular filtration media which are held within a container. The container has openings to let water flow into the loose media and then out of the container. Loose media filters can also contain other components, such as porous membranes. The term "porous composite block" is used to mean a block of granular active filtration media wherein the media is held together, at least partially, by a binding agent. The binding agent and the filtration media form a porous, three-dimensional network. Water can pass through the pores, thereby making contact with the filtration media. It is not necessary to have a container around the porous composite block to hold the filtration media together. Filter devices that include both loose media and porous composite blocks are also possible.

For the purposes of this disclosure, a water treatment device that has "good performance" is one that can perform the following treatments on source water.

Particles and Cysts: Remove at least 99.95% of particles with sizes greater than 3 µm until the reduction in water flow has been reduced by 75%.

Lead: Reduce the lead concentration of influent water that has a 150 ppb lead concentration to no more than 10 ppb over 100 gallons of influent water.

Chloroform: Reduce the chloroform concentration of influent water that has a 450 ppb chloroform concentration to no more than 80 ppb for at least 100 gallons of influent water.

FIG. 1A is a schematic drawing of a porous composite block filter as can be used in some faucet-mount systems. The porous composite block 102 is cylindrical in shape and includes a hollow cylindrical core 104. The hollow cylindrical core 104 can have a top opening 106 in a top surface 108 of the porous composite block 102 and a bottom opening 110 in a bottom surface 112 of the porous composite block 102. In some arrangements (not shown), the hollow cylindrical core 104 may not extend along the whole length of the porous composite block 102, and there may be an opening at only one end. The terms "top" and "bottom" are used for ease of description and are not meant to indicate that the porous composite block 102 must have a specific orientation. It should be understood that the porous composite block 102 can be oriented vertically, horizontally, or at any angle during use in a water treatment system, as required by the particular system.

Figure 1B:
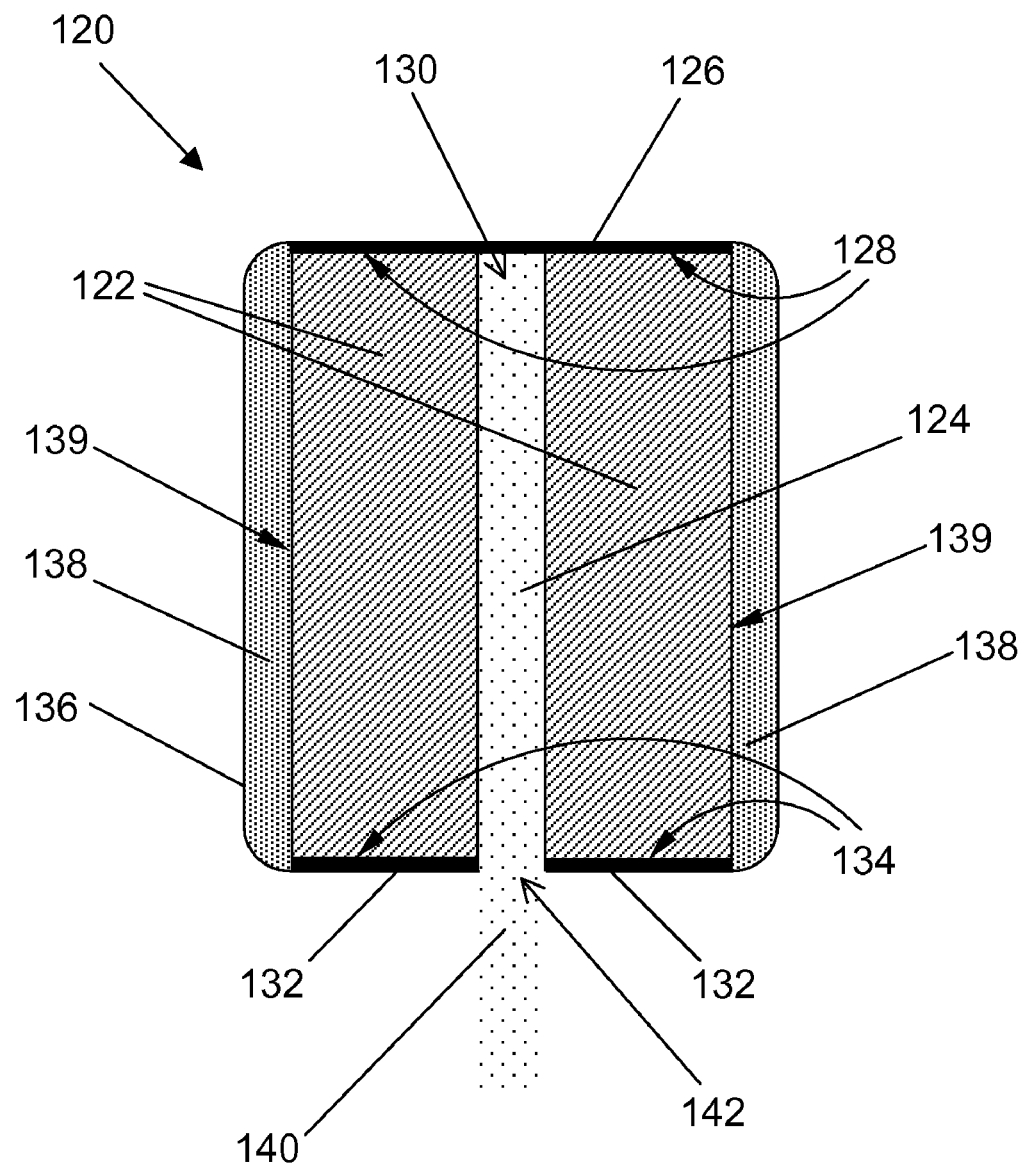
FIG. 1B is a cross-section view of a filter cartridge assembly.

FIG. 1B is a schematic cross-section drawing of a filter cartridge assembly 120 as it can be used in a water treatment system, such as a faucet-mount system, to treat water. In this illustration, the cross section is cut approximately through the center of a filter element 122, such as a porous composite block filter. The filter element 122 includes a hollow filter element core 124 near the center of the filter element 122. The filter element core 124 extends between a top surface 128 and a bottom surface 134 of the filter element 122. There is a top end cap 126 that seals the top surface 128 of the filter element 122 and covers a top opening 130 of the filter element core 124. There is a bottom end cap 132 that seals only the bottom surface 134 but not a bottom opening 142 of the filter element 122. There is a filter cartridge housing 136 that surrounds the filter element 122, leaving an annular space, or untreated water distribution chamber 138 therebetween. Untreated water can enter into the water distribution chamber 138 and be forced by pressure in the inlet water line (not shown) through an external surface 139 of the filter element 122. Untreated water flows through the filter element 122 and thus is treated. Treated water 140 collects in the filter element core 124 after flowing out of the filter element 122. The treated water 140 flows out of the filter element core 124 through the bottom opening 142. Faucet-mount water treatment systems and water flow therethrough has been described in more detail by Wadsworth et al. in U.S. Pat. No. 5,976,362 and in U.S. Pat. No. 6,123,837, which are included by reference herein.

Figure 2A:
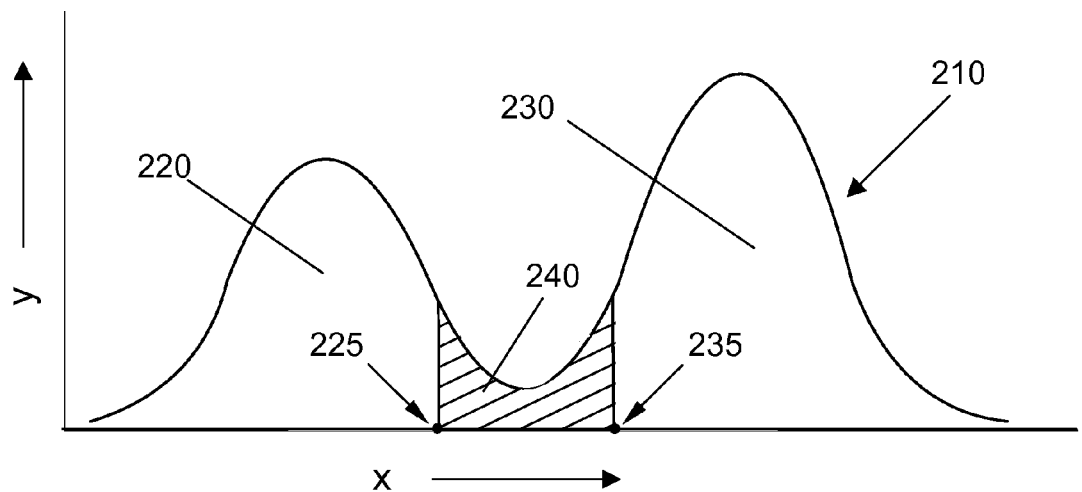
FIG. 2A is a graph of a particle size distribution according to an embodiment of the invention.

In some embodiments of the invention, good performance in a small water treatment device is achieved through selection of size distributions for active media grains in the filter medium of the device. FIG. 2A shows a schematic, semi-logarithmic plot of the number of grains (y) in a water treatment device as a function of the log of grain size (x). The curve 210 of FIG. 2A shows a bimodal grain size distribution, according to an embodiment of the invention. In a first region 220, a first portion of the grains have grains sizes less than the grain size value at point 225. In a second region 230, a second portion of the grains have grains sizes greater than the grain size value at point 235. In a third region 240, a third portion of the grains have grains sizes greater than the grain size value at point 225 and less than the grain size value at point 235. The third portion of the grains in region 240 represents, in one arrangement, no more than 15 volume percent (vol %), in another arrangement, no more than 10 vol %, in yet another arrangement, no more than 5 vol % of the grains in the water treatment device. In any case, the third portion of the grains in region 240 represents at least 1 vol % of the grains in the water treatment device. In some arrangements, between about 10 and 50 vol % of the grains have sizes smaller than the grain size value at point 225. In some arrangements, between about 10 and 50 vol % of the grains have sizes larger than the grain size value (x-value) at point 235. In other arrangements, between about 35 and 50 vol % of the grains have sizes smaller than the grain size value at point 225. In other arrangements, between about 35 and 50 vol % of the grains have sizes larger than the grain size value (x-value) at point 235.

In one embodiment, the grain size value at point 225 is between about 50 µm and 100 µm and the grain size value at point 235 is between about 100 μm and 150 μm. In another embodiment, the grain size value at point 225 is between about 70 μm and 90 μm, and the grain size value at point 235 is between about 110 μm and 130 μm. In some arrangements, the difference in the grain size values at points 225 and 235 is at least 20 μm. In other arrangements, the difference in the grain size values at points 225 and 235 is at least 10 μm. The smallest grains in region 220 have been measured to be about 1 μm. It should be noted that 1 μm is about the detection limit of the measuring methods used. The smallest grains in region 220 may be even smaller than 1 μm and may be even as small as 10 nm. The largest grains in region 230 can be about 200 μm.

In other embodiments, the bimodal grain size distribution can be skewed toward large grain sizes or toward small grain sizes. In yet other embodiments, the grain size distribution can be trimodal or even more multiply modal.

Figure 2B:
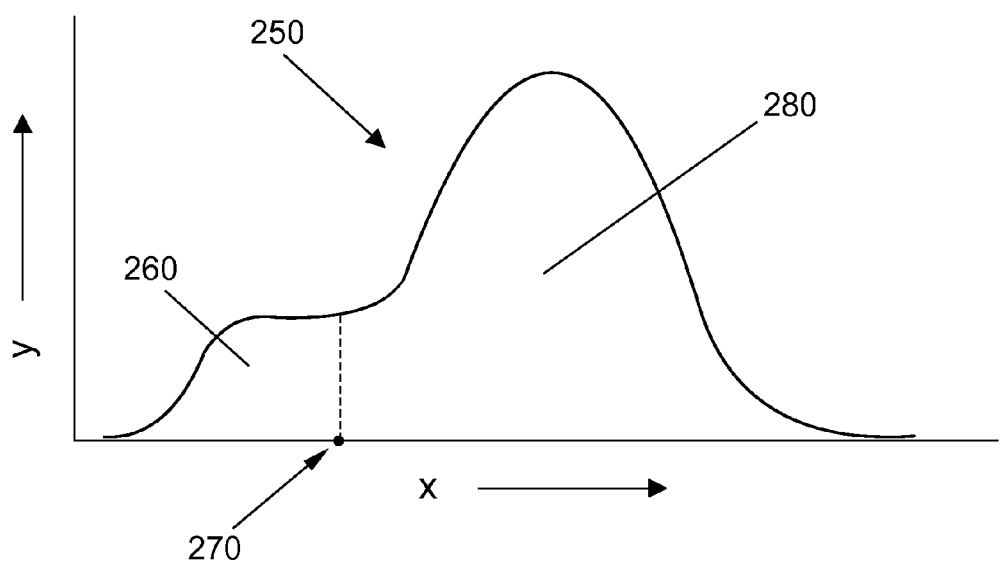
FIG. 2B is a graph of a particle size distribution according to another embodiment of the invention.

FIG. 2B shows a schematic, semi-logarithmic plot of the number of active media grains (y) in a water treatment device as a function of the log of grain size (x). The curve 250 of FIG. 2B shows a grain size distribution, according to another embodiment of the invention. Region 260 indicates a volume of very small grains, or fines, with grain sizes less than the grain size value at point 270. Region 280 indicates a volume of larger grains with grain sizes greater than the grain size value at point 270. In some arrangements, the grain size value at point 270 is between about 15 μm and 45 μm, In other arrangements, the grain size value at point 270 is between about 25 μm and 35 μm. The smallest grains in region 260 have been measured to be about 1 μm. It should be noted that 1 μm is about the detection limit of the measuring methods used. The smallest grains in region 260 may be even smaller than 1 μm and may be even as small as 10 nm. In some arrangements, the region 260 constitutes between about 5 vol % and 30 vol % of the granular media in the filter device. In other arrangements, the region 260 constitutes between about 15 vol % and 25 vol % of the granular active media in the filter device. In some arrangements, grain sizes in region 280 range from about 15 to 250 μm. In other arrangements, grain sizes in region 280 range from about 45 to 180 μm.

Careful selection of grain size combinations can result in a small water treatment device with good performance and good flow rate. Without desiring to be held to any theory or explanation, it may be that appropriately sized small active media grains can fit in the interstices created between larger sized grains. When small grains fit into the interstices, yet leave sufficient open space, water can flow through the device at an acceptable rate and with enough water—water treatment media contact to effect desirable water treatment. Superficial contact time can be used as a standard index of contact time between water and filtration media and is defined as the volume occupied by the filtration media divided by the water flow rate. Sufficient SCT is, in some arrangements, between about 0.5 and 2.25 seconds and, in other arrangements, between about 1 and 2 seconds.

Figure 3:
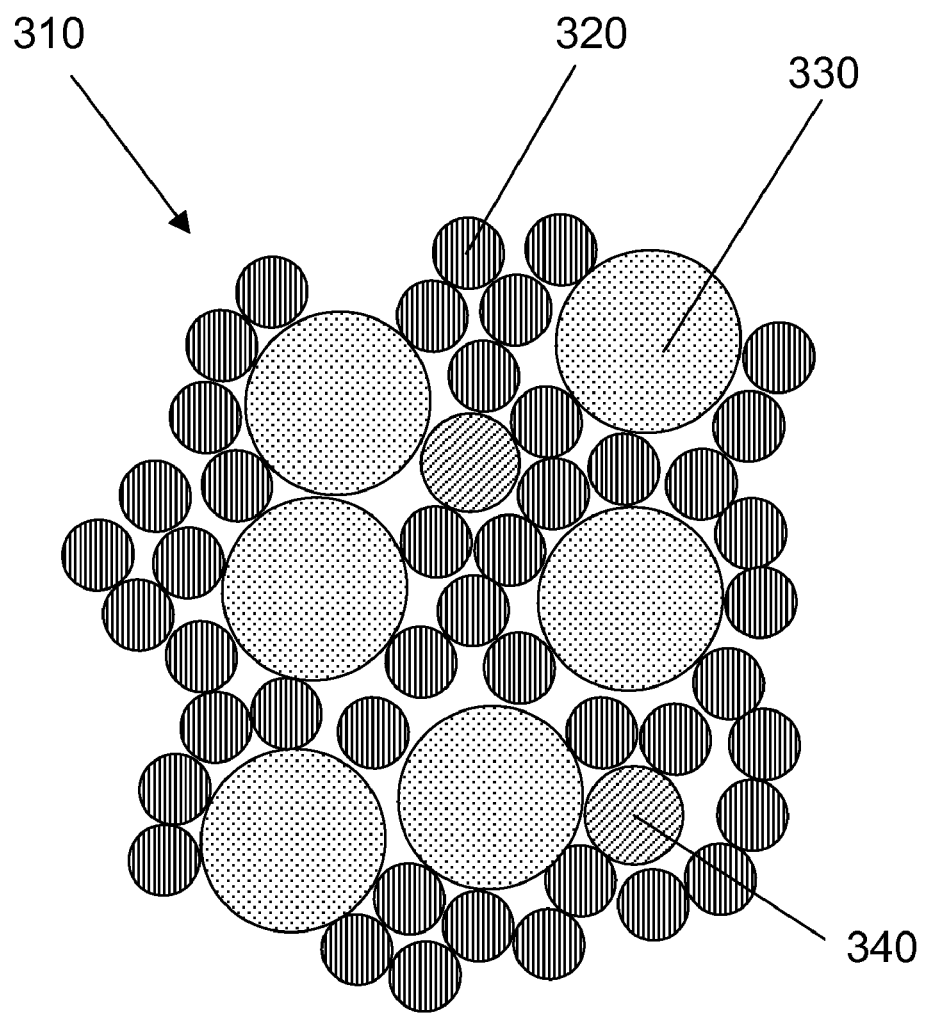
FIGS. 3 is a schematic drawing showing a mixture of filtration media that has a bimodal grain size distribution according to some embodiments of the invention.

FIG. 3 is a schematic drawing showing, in two dimensions, a mixture 310 of active filtration media having a bimodal distribution, as described about in FIG. 2A. All grains are shown as spheres for ease of illustration. In general, active media grains, such as carbon granules, have very irregular shapes. Small grains 320, large grains 330, and medium grains 340 and are mixed together. For ease of illustration, all small grains 320 are shown as approximately the same size, all large grains 330 are shown as approximately the same size, and all medium grains 340 are shown as approximately the same size. In an actual mixture of active filtration media having a bimodal distribution, there are ranges for small grain sizes (e.g., ~1-80 μm), ranges for large grain sizes (e.g., ~100-200 μm), and ranges for medium grain sizes (e.g., ~80-100 μm), as has been discussed above. The grains 320, 330, and 340 combine in a way that leaves enough open space for water to flow through. When small grains fit into the interstices too closely, they can reduce the water flow rate to a trickle. Very slow flow rates, such as flow rates less than 0.5 gallon per minute are undesirable in most water treatment systems.

In one embodiment, active media grains, having any of the possible grain size distributions discussed above can be combined to form a loose media water treatment device. In some arrangements, carbonaceous grains can be combined with grains of other water treatment media to form the loose media device, as will be discussed below. The loose media can be held within a container that has a water inlet and a water outlet, as in known in the art. Weyrauch discloses such a container in U.S. Pat. No. 6,012,232, which is included by reference herein. Loose media water treatment devices are especially useful for gravity flow water treatment systems. In some arrangements, the loose media can occupy a volume that is between about 10 and 100 $cm^3$. In other arrangements, the loose media can occupy a volume that is between about 10 and 50 $cm^3$.

In another embodiment, active media grains, having any of the possible grain size distributions discussed above can be combined with binder particles to form a uniform mixture. In some arrangements, grains of other water treatment media can also be combined in the mixture, as will be discussed below. The mixture can be placed in a mold and treated with energy, such as heat and/or pressure to form a porous composite block for use as a water treatment device, as is well known in the art. Many suitable binders are also known in the art. In some arrangements, small binder particles can be used, such as those disclosed by Taylor et al. in U.S. patent application Ser. No. 10/756478, filed Jan. 12, 2004, which is included by reference herein. In some embodiments of the invention, the overall volume of the porous composite block can be between about 10 and 100 $cm^3$. In other embodiments, the overall volume of the porous composite block can be between about 10 and 50 $cm^3$. Overall volume is used here to mean the volume of the block without regard for macroscopic spaces, such as a hollow core, or for pores between the active media grains. The block is considered as a continuous solid without pores or hollow portions in determining the overall volume.

Figure 4A:
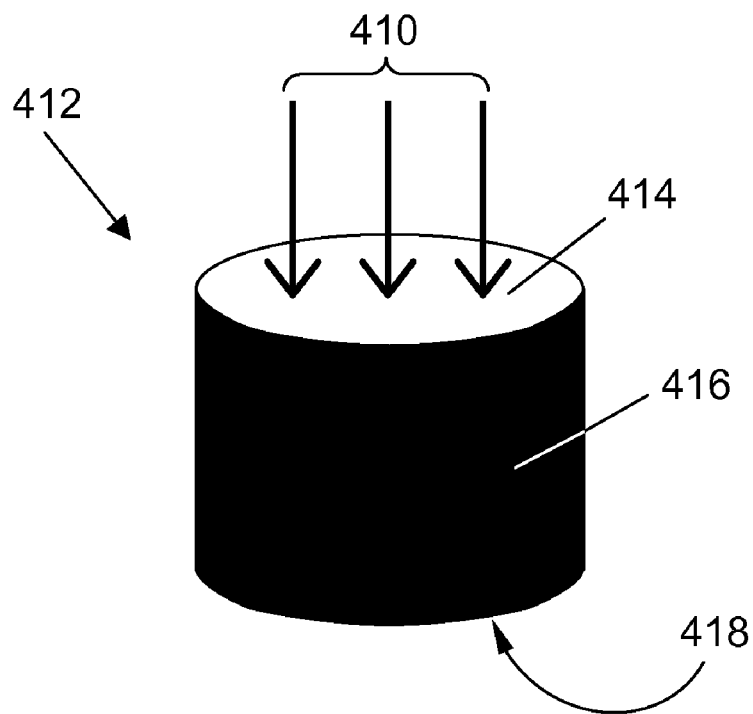
FIGS. 4A and 4B show examples of water entry surfaces in similar cylindrical porous block filters.

Alternatively, the size of small water treatment block devices with good performance can be described as having an external surface area between about 50 and 75 $cm^2$. External surface area is used here to mean the surface area of a block through which incoming water can enter the block. For example, in FIG. 4A, incoming, untreated water 410 can enter cylindrical porous composite block 412 through a top circular surface 414. Outside cylindrical surface 416 all around the block is sealed to prevent water from escaping through the sides. Incoming, untreated water 410 can travel through the block 412 from the surface 414 to opposite surface 418 where treated water (not shown) can exit the block 412. The external surface area of block 412 is the area of the circular surface 414.

Figure 4B:
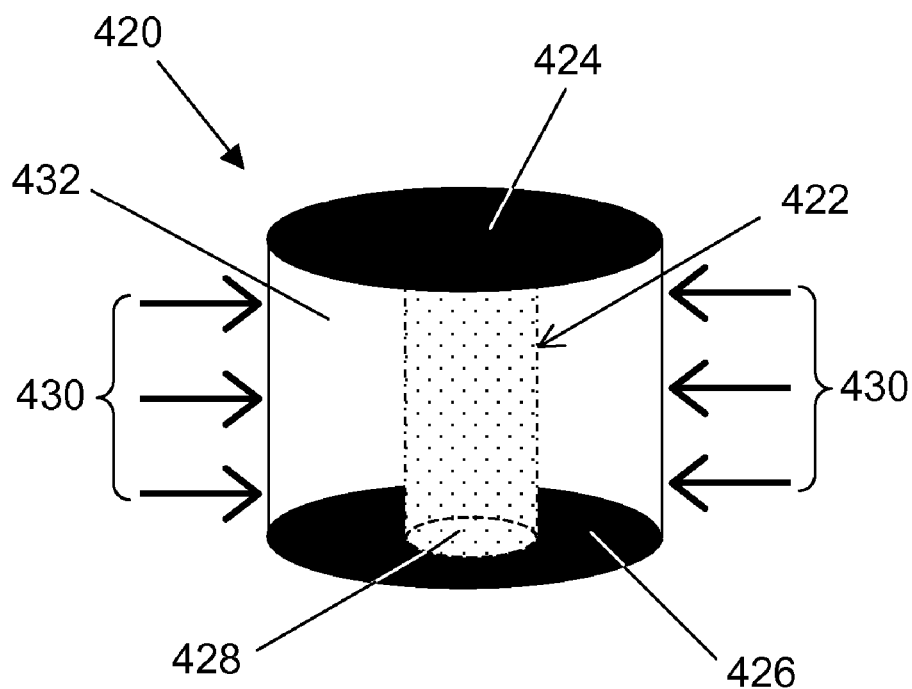

FIG. 4B shows another cylindrical porous composite block 420 with a hollow core 422. Surface 424 is sealed to prevent water from entering either the block 420 or the hollow core 422. Surface 426 is also sealed. There is an opening 428 in the surface 426, which is an open end of hollow core 422. Incoming, untreated water 430 can enter the block 420 all around the circumference of the block 420 through outside cylindrical surface 432. The untreated water 430 can travel through the block 420 from the surface 432 to the hollow core 422 where treated water (not shown) can exit the block 420 through the opening 428. The external surface area of block 420 is the area of outside cylindrical surface 432.

Even if porous composite block 412 and porous composite block 420 have the same dimensions, incoming water enters the blocks 412, 420 through different surfaces which have different areas. Thus the external surface areas of the blocks are different.

Filtration media that are appropriate for use in the embodiments of the invention include activated carbon, carbonized synthetic materials, hydrophobic polymeric adsorbents, activated alumina, activated bauxite, ceramic particles, fuller's earth, diatomaceous earth, silica gel, calcium sulfate, zeolite particles, inert particles, sand, surface charge-modified particles, metal oxides, metal hydroxides, and combinations thereof.

Both loose media and porous composite block filter devices, as described above, can be used in systems for treating water, such as pour-through pitchers and carafes, in-line systems, under-the-sink systems, faucet-mount systems that attach to conventional sink faucets, counter top water dispensers, water dispensers suitable for use in refrigerators, water coolers with and without heating modules, portable filtered drinking devices such as water bottles, and various beverage making apparatus. Typically water treatment systems include a housing that has an inlet for source water to enter the system and an outlet for treated water to leave the system. The source water enters the inlet and flows into a filter device that contains filtration media. There are multiple fluid path within the filtration medium, along which the source water can flow, thus becoming treated water. The treated water can leave the system through the outlet.

EXAMPLE 1

In order to fabricate water treatment block filters, about 16 vol % (19.2 grams) activated carbon (40×80 mesh), about 41 vol % (38.4 grams) carbonaceous organic contaminant scavenger (−325 mesh), about 39 vol % (28.8 grams) ultrahigh molecular weight polyethylene, and about 4 vol % (9.6 grams) ATS lead scavenger (Englehard) were combined in a mixture. About 96 grams of the mixture was poured into a steel cylinder 22 cm long and about 4.6 cm in its inner diameter. The cylinder also had a center steel rod used to define an open core about 1.9 cm in diameter in the resultant block and two end to hold the powder within the cylinder. The cylinder and its contents were heated at 250° C. for an hour. The cylinder was taken from the oven and, while still hot, the end caps of the cylinder were compressed inward a few centimeters to give the block additional strength. After cooling to room temperature, the block was removed from the cylindrical mold and the center steel rod was removed from the block. The block was cut with a rotary saw into 5.1 cm lengths. A block formed by this method measured 4.6 cm in outer diameter, 1.9 cm in inner diameter, and 5.1 cm in length.

A water stream containing approximately 70,000 particles per milliliter, with particle sized averaging between 3 and 4 μm in size was introduced into the block. With an initial SCT of 1.55 seconds, the block was able to remove at least 99.95% of the particles before the SCT increased to above 5.5 seconds.

EXAMPLE 2

In order to fabricate water treatment block filters, about 39 vol % (60 grams) activated carbon (80×325 mesh), about 13 vol % (18 grams) carbonaceous organic contaminant scavenger (−325 mesh), about 43 vol % (30 grams) ultrahigh molecular weight polyethylene, and about 5 vol % (12 grams) ATS lead scavenger (Englehard) were combined in a mixture. About 120 grams of the mixture was poured into a steel cylinder 22 cm long and about 4.6 cm in its inner diameter. The cylinder also had a center steel rod used to define an open core about 1.9 cm in diameter in the resultant block and two end caps to hold the powder within the cylinder. The cylinder and its contents were heated at 250° C. for an hour. The cylinder was taken from the oven and, while still hot, the end caps of the cylinder were compressed inward a few centimeters to give the block additional strength. After cooling to room temperature, the block was removed from the cylindrical mold and the center steel rod was removed from the block. The block was cut with a rotary saw into 5.1 cm lengths. A block formed by this method measured 4.6 cm in outer diameter, 1.9 cm in inner diameter, and 5.1 cm in length.

A water stream containing 318 ppb (parts per billion) chloroform was introduced into the block. The block was able to remove all detectable chloroform from the first 120 gallons of water that passed through the block. After 150 gallons of the water had passed through the block, only 9.3 ppb chloroform was detected in the treated water.

A water stream containing 142 ppb of lead was introduced into the block. The block was able to reduce the lead level to no more than 0.3 ppb over 150 gallons of flow.

Initially, the flow rate of the block was 0.73 gpm (gallons per minute) resulting in an initial superficial contact time (SCT) of 1.53 seconds. The flow rate averaged over the length of these experiments, that is over 150 gallons of flow, was 0.59 gpm, resulting in a SCT of 1.89 seconds.

EXAMPLE 3

In order to fabricate water treatment block filters, about 50 vol % (76.8 grams) activated carbon (80×325 mesh), about 9 vol % (12.8 grams) carbonaceous organic contaminant scavenger (−325 mesh), about 36 vol % (25.6 grams) ultrahigh molecular weight polyethylene, and about 5 vol % (12.8 grams) ATS lead scavenger (Englehard) were combined in a mixture. About 128 grams of the mixture was poured into a steel cylinder 22 cm long and about 4.6 cm in its inner diameter. The cylinder also had a center steel rod used to define an open core about 1.9 cm in diameter in the resultant block and two end to hold the powder within the cylinder. The cylinder and its contents were heated at 250° C. for an hour. The cylinder was taken from the oven and, while still hot, the end caps of the cylinder were compressed inward a few centimeters to give the block additional strength. After cooling to room temperature, the block was removed from the cylindrical mold and the center steel rod was removed from the block. The block was cut with a rotary saw into 5.1 cm lengths. A block formed by this method measured 4.6 cm in outer diameter, 1.9 cm in inner diameter, and 5.1 cm in length.

A water stream containing approximately 69,000 particles per milliliter, with particle sized averaging between 3 and 4 μm in size was introduced into the block. With an initial SCT of 1.92 seconds, the block was able to remove at least 99.95% of the particles before the SCT increased to above 7.4 seconds.

EXAMPLE 4

In order to fabricate water treatment block filters, about 32 vol % (49.5 grams) activated carbon (80×325 mesh), about 24 vol % (22.0 grams) activated carbon (−325 mesh), about 39 vol % (27.5 grams) ultrahigh molecular weight polyethylene, and about 5 vol % (11.0 grams) ATS lead scavenger (Englehard) were combined in a mixture. About 110 grams of the mixture was poured into a steel cylinder 22 cm long and about 4.6 cm in its inner diameter. The cylinder also had a center steel rod used to define an open core about 1.9 cm in diameter in the resultant block and two end to hold the powder within the cylinder. The cylinder and its contents were heated at 250° C. for an hour. The cylinder was taken from the oven and, while still hot, the end caps of the cylinder were compressed inward a few centimeters to give the block additional strength. After cooling to room temperature, the block was removed from the cylindrical mold and the center steel rod was removed from the block. The block was cut with a rotary saw into 5.1 cm lengths. A block formed by this method measured 4.6 cm in outer diameter, 1.9 cm in inner diameter, and 5.1 cm in length.

A water stream containing approximately 70,000 particles per milliliter, with particle sized averaging between 3 and 4 µm in size was introduced into the block. With an initial SCT of 1.92 seconds, the block was able to remove at least 99.95% of the particles before the SCT increased to above 6.2 seconds.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A mixture for forming a porous composite block for a water treatment block filter comprising;
    (a) a first carbon material having a first grain size between about 100 µm and 200 µm;
    (b) a second carbon material having a second grain size between about 1 µm and 70 µm;
    (c) a binder;
    (d) wherein the first carbon material, the second carbon material and the binder are formed as a mixture;
    (e) wherein the first carbon material and second carbon material are different from one another and are selected from the group consisting of activated natural carbon and carbonaceous organic contaminant scavenger;
    (f) wherein the first carbon material is between about 35-45% volume;
    (g) wherein the second carbon material is between about 10-30% volume; and
    (h) wherein the binder is between about 30-50% volume.

2. The mixture of claim 1 wherein the composite block that is formed by the mixture has a total volume of about 10 $cm^3$ to about 100 $cm^3$.

3. The mixture of claim 2 wherein the composite block is capable of removing from water at least 99.95% of particles with sizes greater than 3 µm until the reduction in water flow has been reduced by 75%.

4. The mixture of claim 3 wherein the composite block is effective to reduce the chloroform concentration by about 450 ppb in influent water to no more than about 80 ppb.

5. The mixture of claim 4 wherein the composite block has a superficial contact time less than about 2.1 seconds.

6. A porous composite block for a water treatment block filter comprising:
    (a) a first carbon material having a first grain size between about 100 µm and 200 µm;
    (b) a second material having a second grain size between about 1 µm and 70 µm;
    (c) a binder; (d) wherein the first carbon material, the second carbon material and the binder are formed as a mixture, and wherein the first carbon material and second carbon material are different from one another and are selected from the group consisting of activated natural carbon and carbonaceous organic contaminant scavenger;
    (e) wherein the total volume of the block is about 10 $cm^3$ to about 100 $cm^3$;
    (f) wherein the block is capable of removing from water at least 99.95% of particles with sizes greater than 3 µm until the reduction in water flow has been reduced by 75%;
    (g) wherein the block is effective to reduce the chloroform concentration by about 450 ppb in influent water to no more than about 80 ppb; and
    (h) wherein the composite block has a superficial contact time less than about 2.1 seconds;
    (i) wherein the first carbon material is between about 35-45% volume
    (j) wherein the second carbon material is between about 10-30% volume; and
    (k) wherein the binder is between about 30-50% volume.

* * * * *